April 29, 1958  A. HERTZBERG ET AL  2,832,666
METHOD AND APPARATUS FOR CONTINUOUSLY CARRYING OUT GAS
REACTIONS WHICH REQUIRE A HIGH TEMPERATURE TO PROMOTE
THE REACTION AND RAPID COOLING TO PRESERVE
THE REACTION PRODUCT
Filed Dec. 23, 1954
4 Sheets-Sheet 1
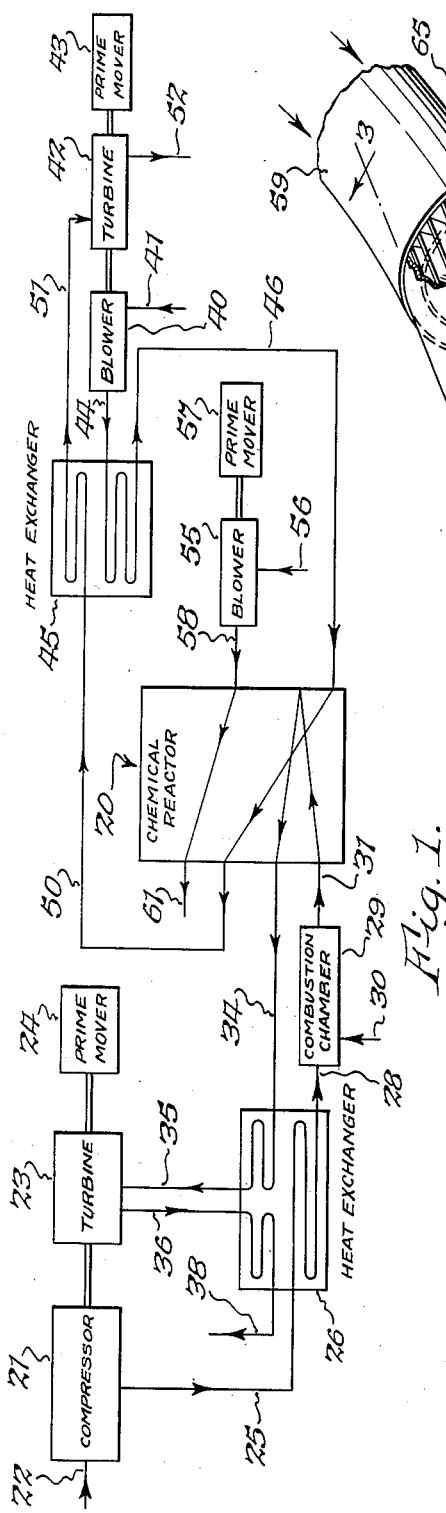
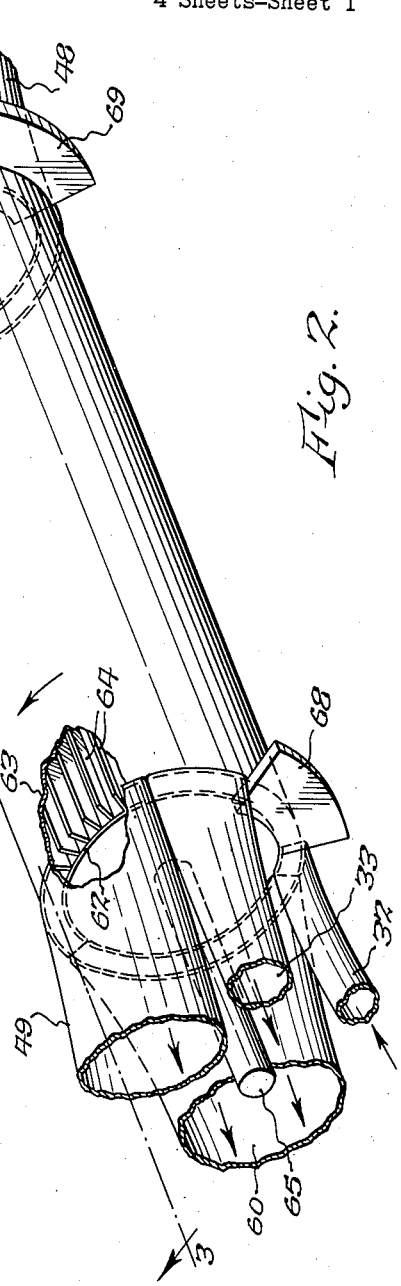
INVENTORS.
Abraham Hertzberg
Herbert S. Glick
William Squire
By Popp and Sommer
Attorneys.

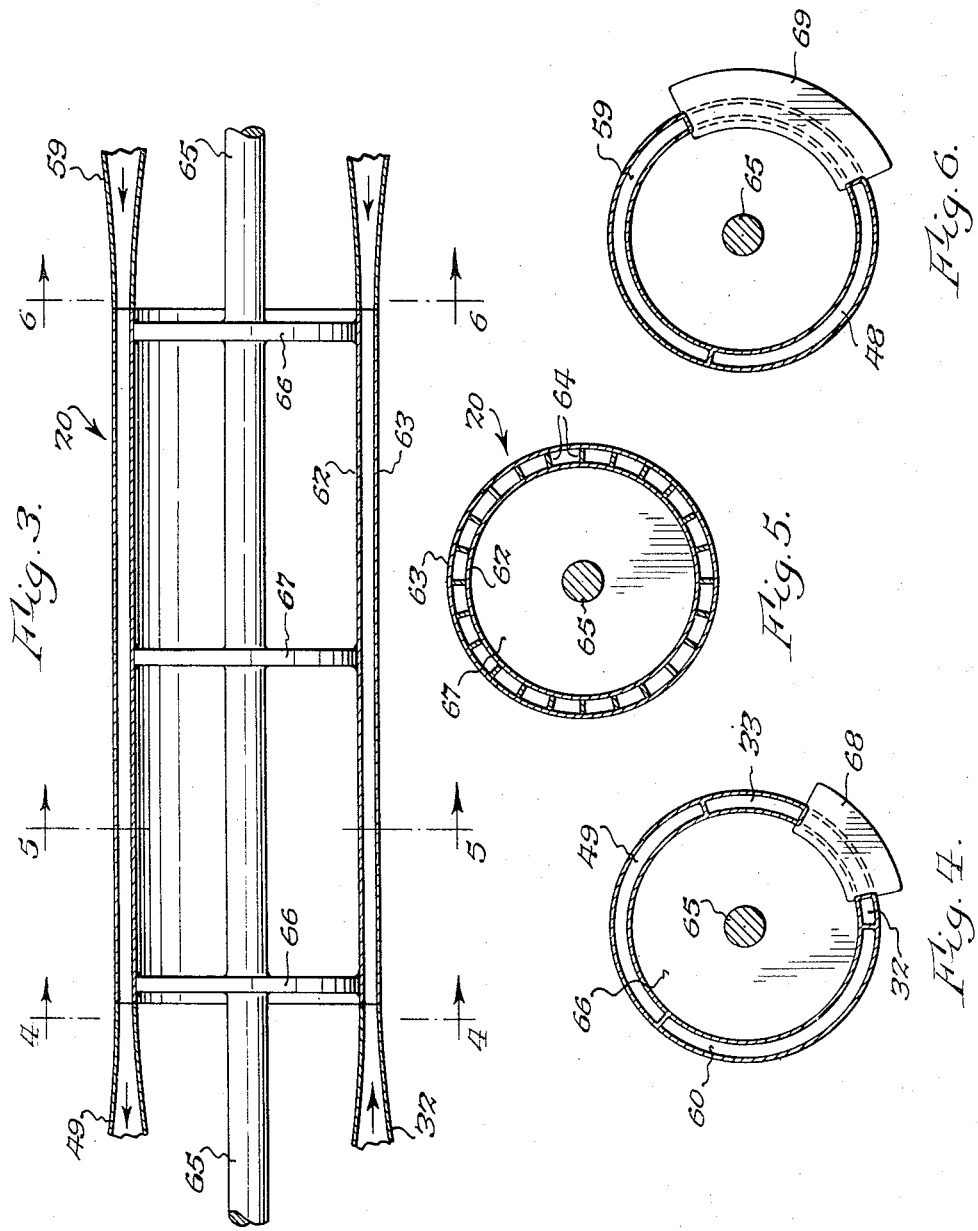

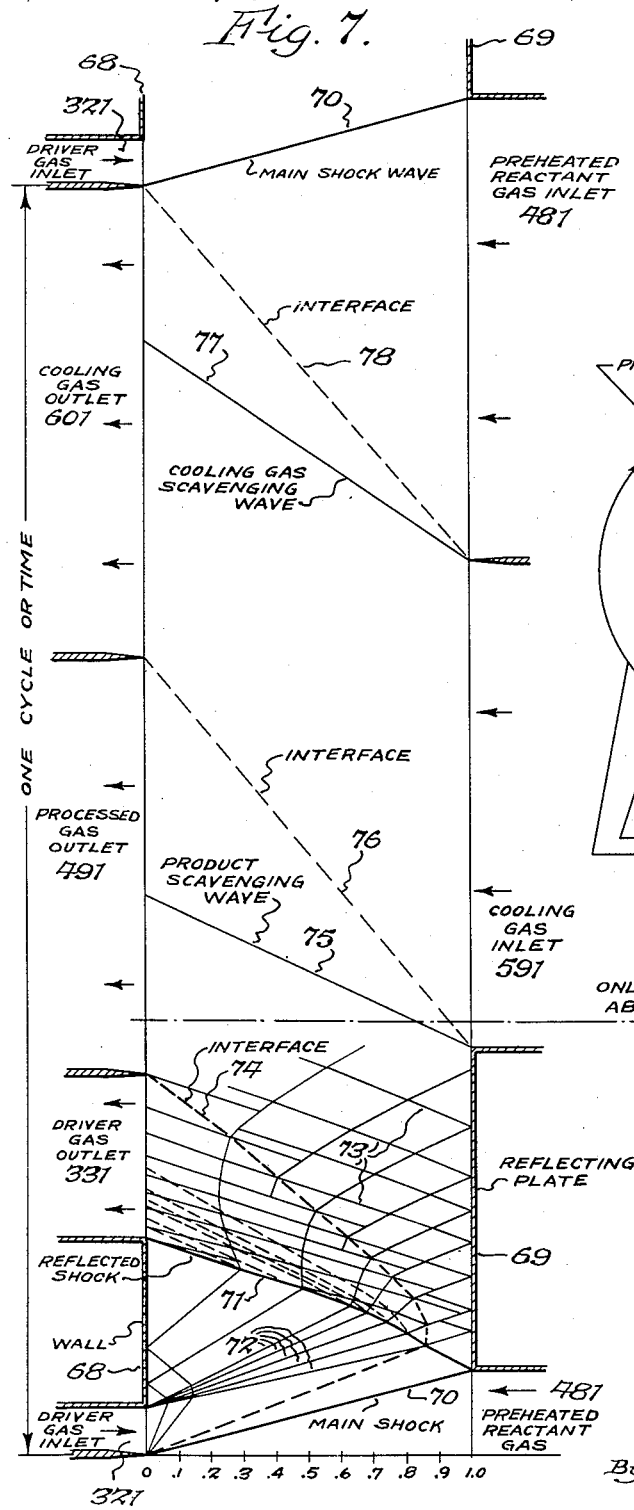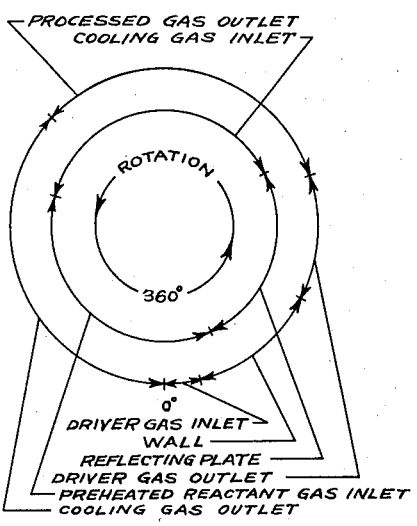

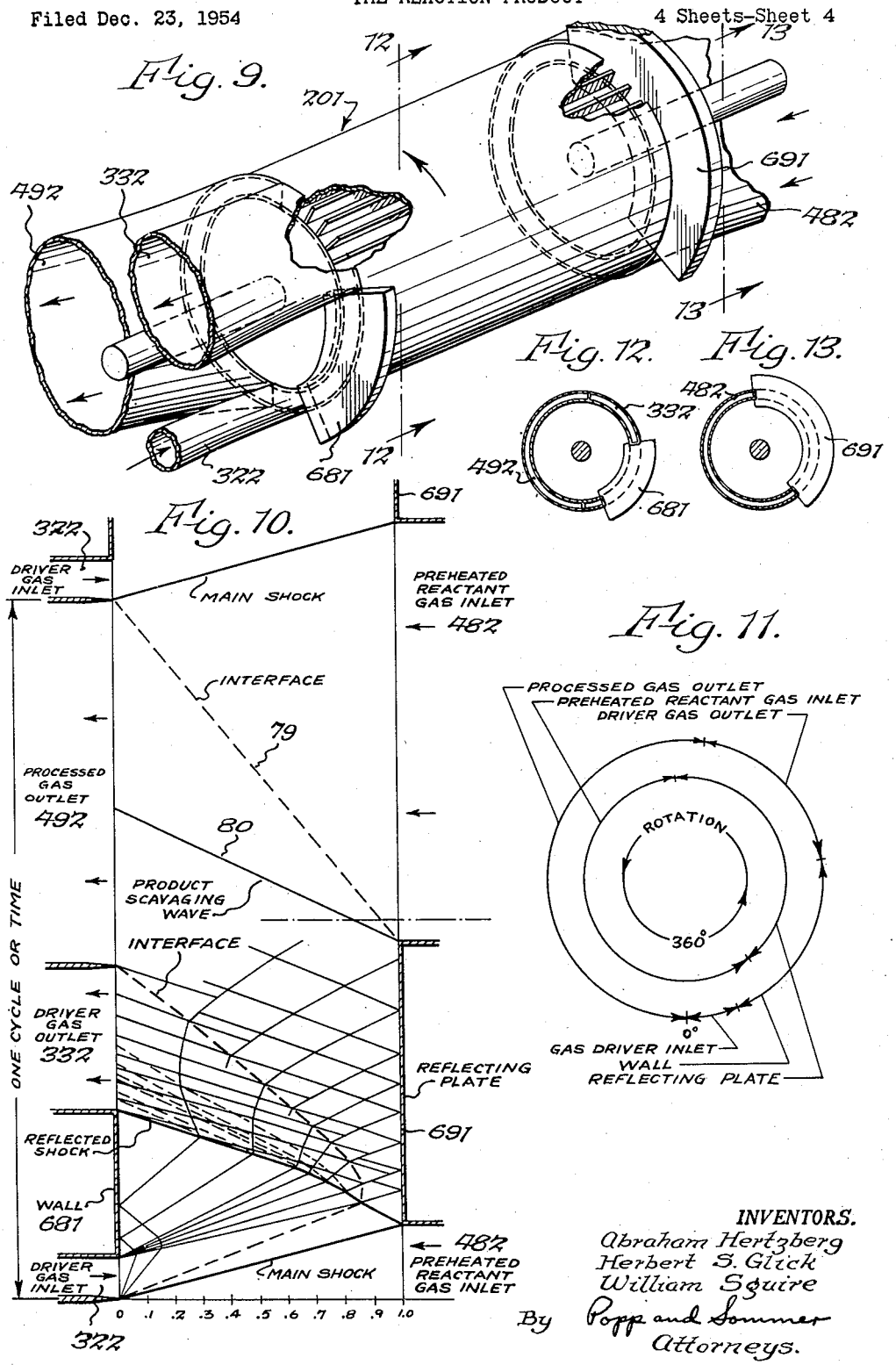

United States Patent Office 2,832,666
Patented Apr. 29, 1958

2,832,666

METHOD AND APPARATUS FOR CONTINUOUSLY CARRYING OUT GAS REACTIONS WHICH REQUIRE A HIGH TEMPERATURE TO PROMOTE THE REACTION AND RAPID COOLING TO PRESERVE THE REACTION PRODUCT

Abraham Hertzberg, Buffalo, Herbert S. Glick, Eggertsville, and William Squire, Buffalo, N. Y., assignors to Cornell Aeronautical Laboratory, Inc., Buffalo, N. Y., a corporation of New York Application December 23, 1954, Serial No. 477,222

19 Claims. (Cl. 23—1)

This invention relates to a method and apparatus for continuously carrying out gas phase reactions which require a high temperature to promote the reaction and rapid cooling to preserve the reaction product.

The invention has general application to all suitable gas phase reactions, such as the fixation of nitrogen from air, as well as to other types of reactions such as the production of acetylene from hydrocarbons such as methane, by pyrolysis or partial oxidation. Another important reaction to which the present invention is applicable is the formation of hydrazine by the pyrolysis or partial oxidation of ammonia. These are intended merely as examples of gas phase reactions to illustrate and not limit the general applicability of the present invention.

At present, several techniques are utilized in the chemical industry for high temperature gas phase reactions. The electric arc, for example, is used to heat the reactant gas to reaction conditions. However, this method is not widely used except where large sources of cheap hydroelectric power are available. The usual way in which the reaction conditions are reached is by passing the gas through a furnace using relatively cheap fuels to supply the required energy. However, the temperatures at which the reactant gas can be processed is limited by the structural strength and corrosion resistance of the construction materials.

The aforementioned deficiencies and disadvantages of the prior techniques are overcome with the practice of the present invention which employs non-steady waves to effect large temperature changes very rapidly. These nonsteady waves are pressure waves which successively heat and cool the reactant gas rapidly and uniformly.

The basic phenomena associated with non-steady waves can be understood by considering a region of high pressure gas separated from a region of low pressure gas by a partition. If the partition is removed, the pressure will tend to equalize, but this cannot take place instantaneously. Instead, pressure waves propagate through the gas to establish the final equilibrium. The equilibrium is approached through violent oscillations involving intermediate temperatures and pressures higher than the initial ones before removal of the partition. The apparatus providing the two regions separated by a partition is known as a shock tube.

According to the practice of the present invention, two types of pressure waves are involved, compression waves which raise the pressure and temperature, and expansion waves which decrease them. The compression waves travel faster than the speed of sound and are known as shock waves. The strength of a shock wave is measured by its Mach number, which is the velocity of the shock wave, divided by the speed of sound in the gas into which the shock wave is moving. In a shock tube of the type referred to above, the factors which determine the speed of travel of a shock wave, and hence its strength, are the pressure ratio and speed of sound ratio between the two regions on opposite sides of the partition. The shock wave is a discontinuity for practical purposes, but the expansion waves fan out and the cooling rate decreases as the distance from the origin increases. Therefore, by using wave processes, a volume of gas can be rapidly heated and cooled relatively uniformly.

It is accordingly the primary objective of the present invention to produce continuously a reaction product resulting from the successive subjection of separate volumes of reactant gas to the action of shock and expansion waves by which each volume of reactant gas is rapidly and uniformly heated to a sufficiently high temperature to form the desired reaction product and thereafter rapidly and uniformly cooled to prevent decomposition of the reaction product.

Another important object of the present invention is to produce such reaction product under circumstances where there is precise control of the temperature and the duration of the heating and cooling effects.

An important feature of the invention is the provision of a novel type of chemical reactor. Its principal advantages over chemical reactors as heretofore known include extremely rapid rates of heating and cooling reacting gases, very precise control over reaction parameters, effective reaction temperatures far above maximum wall temperatures, a continuous flow system with a rate of chemical production competitive with other units of comparable size, and low energy consumption per unit mass of product as compared with other reactors using similar chemistry.

In the chemical reactor of the present invention, large quantities of gas can be rapidly cycled through an accurately controlled temperature pulse. The maximum temperature of the reactant gas can greatly exceed the average wall temperature of the reactor since the reactor walls are subjected to rapid alternate heating and cooling phases. Therefore, maximum reaction temperatures are feasible which are considerably above those used in present chemical reactors. Increasing the maximum reaction temperatures insures higher reaction rates and, in the case of endothermic reactions, higher yields of chemical products.

For industrial utilization, an ideal high temperature chemical reactor must raise the reactant gas to the required reaction temperatures and cool the high temperature products fast enough so that there will be a minimum of product lost during the cooling phase. Also, precise control of the temperature history of the reactant gas is necessary to achieve maximum efficiency of the cycle. It is important that a chemical reactor be able to use cheap energy sources, such as hydrocarbon fuels. These requirements of such an ideal high temperature chemical reactor are satisfied by the chemical reactor of the present invention.

Other objects and advantages of the invention will be apparent from the following description and accompanying drawings in which:

Fig. 1 is a flow chart of the preferred process and apparatus of the present invention.

Fig. 2 is a perspective view of the chemical reactor diagrammatically represented in Fig. 1, portions of the reactor being broken away to reveal interior structure.

Fig. 3 is a vertical longitudinal sectional view through the reactor shown in Fig. 2 and taken on line 3—3, Fig. 2.

Fig. 4 is a vertical transverse sectional view through one end thereof, taken on line 4—4, Fig. 3.

Fig. 5 is a vertical transverse sectional view through the intermediate part thereof, taken on line 5—5, Fig. 3.

Fig. 6 is a vertical transverse sectional view through the other end thereof, taken on line 6—6, Fig. 3.

Fig. 7 is a diagram illustrating the interaction of the various waves developed in the reactor shown in Fig. 2, the abscissa of this diagram representing the axial distance along the length of the reactor tubes, and the ordinate of this diagram representing the developed circumference of the reactor and also time.

Fig. 8 is a diagram based on the diagram shown in Fig. 7 and illustrates the annular orientation of the inlet and outlet nozzles at opposite ends of the reactor for the various gases employed, and viewed from the same direction and related to the direction of rotation of the reactor.

Fig. 9 is a perspective view of a modified reactor and viewed from the same direction as employed for Fig. 2.

Fig. 10 is a diagram similar to that shown in Fig. 7 but specific to the modified form of reactor as shown in Fig. 9.

Fig. 11 is a diagram similar to Fig. 8 but related to the diagram shown in Fig. 10.

Fig. 12 is a vertical transverse sectional view, on a reduced scale, through one end of the modified reactor shown in Fig. 9, this view being taken on line 12—12 thereof.

Fig. 13 is a vertical transverse sectional view, on a reduced scale, through the other end of the modified reactor shown in Fig. 9, this view being taken on line 13—13 thereof.

In general, a gas phase reaction is carried out in accordance with the present invention by introducing the reactant gas into the upstream end of a chamber or reactor tube, and at the appropriate time by introducing a pulse or pressurized driver gas into the downstream end of the chamber or reactor tube whereby a shock wave and also a fan of expansion waves are generated which propagate upstream through the reactant gas. Passage of the shock wave through the reactant gas raises it to reaction temperature and the subsequent passage of the expansion waves through the reacted gas cools the same so as to preserve the reaction product. The shock wave and expansion waves are successively reflected at the upstream end of the chamber or reactor tube whereby the driver gas is first scavenged and the reaction product resulting from the processing by the waves is thereafter scavenged from the downstream end of the chamber or reactor tube.

In order to obtain the requisite mass-handling capacity for industrial operation, the employment of a reactor of the type shown in Fig. 2 is preferred. It may be considered as a bank of reactor tubes mounted on a rotating drum with the rotational motion past valve plates and nozzles replacing the partitions or diaphragms of the conventional form of shock tube heretofore mentioned. An observer moving with the tubes would see a series of cycles with the hot reaction zone moving around the drum so that no tube is continuously exposed to the high reaction temperature. On the other hand, a stationary observer sees a practically continuous process with driver gas, heated and compressed as hereinafter explained, entering through a stationary nozzle, a hot reaction zone fixed in space, and the chemical reaction product or processed gas emerging through another motionless nozzle. The operation of such a reactor is flexible since the steady rotational motion of the drum gives precise control of the wave processes.

As previously explained, the pressure ratio between the reactant gas and driver gas is a factor determining the strength of the shock wave generated. The required pressure ratio will depend upon the reaction temperature desired to be produced for the processing of a particular reactant gas. In accordance with the present invention, the process may be made more efficient by either or both of the following methods. The driver gas can be preheated, thus reducing the pressure ratio required for the process. The reactant gas can also be preheated, again reducing the pressure ratio required for the process; since the increment of temperature rise in the reactant gas that must be produced by action of the shock wave in order to reach the elevated temperature at which the particular chemical reaction is intended to take place, is smaller than if the reactant gas were not preheated.

In the form of the invention shown in Figs. 1 through 8 inclusive, the apparatus is shown as including means for passing a cooling gas through the tubes of the reactor in an appropriate phase of the complete cycle of operation as hereinafter explained, in order to cool the tube walls before receiving a fresh charge of the preheated reactant gas. The necessity for such a cooling pass is largely dependent upon the construction materials employed in the reactor and the temperature at which the particular reactant gas is being processed which temperature will obviously be dependent upon the nature of the reactant gas and its chemically reactive character. At this point, it can be said in general that it is desirable to prevent excessive heating of the reactor tubes so as to prevent structural failure of the reactor. Accordingly, the complete process and apparatus of the present invention can be conveniently considered under the following four divisions:

(1) Preparing driver gas
(2) Preparing reactant gas
(3) Preparing cooling gas
(4) Chemical reactor A consideration of the apparatus for preparing the driver, reactant and cooling gases can be understood by referring to the flow chart shown in Fig. 1.

*Preparing driver gas*

While the driver gas may be of any suitable nature or composition such as steam or compressed air, the process chart in Fig. 1 contemplates the products of combustion between air and a hydrocarbon fuel as the driver gas. The driver gas must be compressed and heated sufficiently so that the required shock strengths are generated within the chemical reactor indicated generally at 20. As shown in Fig. 1 air enters a compressor 21 through the inlet line 22, this compressor being suitably driven by a turbine 23 in turn partially driven by a prime mover 24. The turbine 23 and its prime mover 24 may be of any suitable type. The compressor 21 also may be of any suitable type such as an intercooled, multi-stage compressor. The compressed air discharged by the compressor 21 is conducted by the line 25 to a heat exchanger 26 which may be of any suitable type. The compressed and heated air leaving the heat exchanger 26 is conducted by the line 28 to a combustion chamber 29 which may be of any suitable type. A hydrocarbon fuel of any suitable type is introduced into the combustion chamber 29 through the fuel inlet line 30. In the combustion chamber the heated and compressed air and fuel mixture is combusted in any suitable manner to provide a hot, compressed driver gas which is conducted by the line 31 to a nozzle 32 (Fig. 2) adjacent one end of the chemical reactor 20.

After the driver gas has performed its function within the chemical reactor 20 the driver gas is discharged into an outlet nozzle 33 (Fig. 2) which communicates with the line 34 shown in Fig. 1. The line 34 conducts the exhausted driver gas into the heat exchanger 26 in which some of the heat of the discharged driver gas is given up to the compressed air passing from the compressor 21 to the combustion chamber 29.

The discharged driver gas after leaving the heat exchanger 26 is conducted by the line 35 to the inlet of the turbine 23 wherein the energy of the driver gas is utilized to drive the turbine 23. The driver gas leaves the turbine 23 and is conducted by the line 36 again to the heat exchanger 26 wherein the driver gas gives up still further heat to the air flowing from the compressor 21 to the combustion chamber 29. The driver gas is finally discharged from the heat exchanger 26 to the atmosphere through the exhaust line 38.

*Preparing reactant gas*

The reactant gas, the nature of which will depend upon the chemical reaction intended to be carried out within the chemical reactor 20, is shown in Fig. 1 as entering a blower 40 through the reactant gas inlet line 41. The blower 40 may be of any suitable type and is shown as driven by a turbine 42, in turn partially driven by a prime mover 43. The turbine 42 and its prime mover 43 may be of any suitable type.

The reactant gas leaves the blower 40 through the line 44 and is conducted thereby to a heat exchanger 45 which may be of any suitable type. In passing through the heat exchanger, the reactant gas picks up heat and leaves this heat exchanger through and is conducted by the line 46 to the preheated reactant gas inlet nozzle 48 (Fig. 2) arranged at the end of the chemical reactor 20 opposite from that end at which the driver gas inlet and outlet nozzles 32 and 33 respectively are located.

After the preheated reactant gas is processed within the chemical reactor 20, the processed gas is discharged from the chemical reactor into the outlet nozzle 49 (Fig. 2). This processed gas outlet nozzle 49 communicates with a line 50 as shown in Fig. 1 which conducts the heated processed gas to the heat exchanger 45 through which the processed gas flows and in doing so gives up some of its heat to the reactant gas passing from the blower 40 to the reactor 20. The slightly cooled processed gas leaves the heat exchanger 45 through the line 51 and is conducted thereby to the inlet of the turbine 42. The processed gas flows through the turbine 42 and serves to partially drive the same, leaving through the discharge line 52.

The processed gas discharged through the line 52 is reclaimed in any suitable manner and by any suitable apparatus (not shown) for making the most effective use of the processed gas or reaction products resulting from the chemical reaction that took place within the chemical reactor 20.

Preparing cooling gas

The passing of a cooling gas through the chemical reactor 20 is not essential in all cases and depends in large measure upon the temperature level intended to be produced within the chemical reactor for carrying out the particular chemical reaction desired. However, the passage of cooling gas through the chemical reactor is highly desirable, even if not required, in most chemical gas phase reactions destined to be carried out in the chemical reactor of the present invention, and therefore provision for such cooling pass is preferred.

In most cases, the cooling gas can be air and as shown in Fig. 1 such air is drawn from the atmosphere into a blower 55 through the inlet line 56. The blower 55 may be of any suitable type and is shown as driven by a prime mover 57. The air discharged by the blower 55 is connected by the line 58 to the cooling gas inlet nozzle 59 (Fig. 2) arranged at that end of the reactor 20 at which the preheated reactant gas inlet nozzle 48 is located. At the opposite end of the chemical reactor an outlet nozzle 60 (Fig. 2) is arranged to receive the cooling gas after it has passed axially through the chemical reactor 20. This cooling gas outlet nozzle 60 is connected to an exhaust line 61 shown in Fig. 1 which may discharge the cooling gas into the atmosphere.

Chemical reactor

As previously alluded to, the chemical reactor 20 comprises a multiplicity of reactor tubes mounted on a rotating drum with the opposite ends of such reactor tubes being open and traversing the various nozzles heretofore described and located at opposite ends of the reactor.

To this end the chemical reactor 20 is shown as comprising inner and outer cylindrical shells 62 and 63 respectively, arranged concentric and in spaced relation to one another. The annular space between the shells 62 and 63 is shown as being divided up by a series of longitudinally extending partitions 64 so as to provide a multiplicity of shock tubes of uniform size arranged in an annular bank, as best shown in Fig. 5. The inner and outer longitudinal edges of the partitions 64 may be connected to the shells 62 and 63 in any suitable manner as by being welded thereto.

The assembly so far described is shown as supported for rotational movement on an axle or shaft 65 arranged centrally of the shells and extending longitudinally therethrough and carries two disc-like end heads 66, one adjacent each end of the reactor, and a similar intermediate disc-like support 67, the three disc-like members being arranged within the inner shell and each having its periphery engaging the inner shell and suitably connected thereto as by welding.

The axle 65 is arranged to be rotated in a predetermined direction at a predetermined angular velocity by any suitable driving means (not shown). Such rotational drive for the chemical reactor 20 may be variable so as to adapt the chemical reactor 20 for handling the processing of different reactant gases and also for permitting the adjustment of the rotative speed of the reactor for a given process in order to obtain maximum efficiency of operation.

Referring to Figs. 2 and 4, it will be noted that an arcuate wall 68 is shown as arranged between the driver gas inlet nozzle 32 and the driver gas outlet nozzle 33.

Referring to Figs. 2 and 6, it will be noted that a similar arcuate member 69 but of longer circumferential extent and hereinafter referred to as a reflecting plate, is arranged between the reactant gas inlet nozzle 48 and the cooling gas inlet nozzle 59.

The wall 68 and reflecting plate 69 are stationary members as are the various other nozzles heretofore referred to, all of which are supported in such stationary manner in any suitable way. Such wall 68 and reflecting plate 69 serve as valve plates and their purpose will be more fully understood when the operation of the chemical reactor 20 is now considered.

Since the same things occur in each of the reactor tubes as shown in Fig. 2, the operation can best be understood by explaining what happens in one of the reactor tubes during one complete revolution of the reactor drum. To this end reference is made to the diagrams in Figs. 7 and 8. Preheated reactant gas enters the tube from the upstream end ("upstream" referring to the end at which the reactant gas enters) through the inlet 481, and flows subsonically toward the downstream end, or to the left as shown in Fig. 7. When this tube rotates past the driver gas nozzle, a jet of hot, compressed driver gas flows into it through the inlet 321 generating a shock wave 70 which reverses the flow of the reactant gas while heating and compressing it. The shock wave 70 then propagates to the upstream end of the tube, which is now closed due to the upstream end of the tube being rotated to a position opposite the reflecting plate 69. The shock wave 70 is reflected from the reflecting plate 69 and now moves toward the downstream end of the tube. The reflected shock wave is represented in the diagram of Fig. 7 by the numeral 71. This brings the reactant gas to rest and heats it to the reaction conditions.

While the reactant gas is being heated to the reaction conditions, the downstream end of the tube rotates past the driver gas inlet 321 and is closed by the wall 68. This suddenly cuts off the flow of driver gas into the reactor tube and causes a fan of expansion waves 72 to be generated at the downstream end and these waves propagate upstream toward the hot reaction zone. The expansion waves 72 pass through the heated reactant gas and reflect from the reflecting plate 69 at the closed upstream end of the tube. The reflected expansion waves are represented by the numeral 73. The passage of these expansion waves through the driver gas provides a scavenging action which removes the driver gas from the tube at the downstream end through the driver gas outlet 331. When the initial expansion waves 72 pass through the heated reactant gas and reflect at the closed upstream end, the total temperature of the reacted gas is sharply reduced and the high temperature reaction products "frozen." The pressure of the cooled, reacted gas falls as more expansion waves pass through it and the reacted gas begins to accelerate toward the downstream end. Referring to Fig. 7, the interface between the driver gas and the reactant gas is represented by the dotted line 74.

When the interface 74 arrives at the downstream end of the reactor tube, this particular tube moves opposite the processed gas outlet 491. The pressure of the processed gas at the upstream end of the tube falls and the upstream end of the tube is opened to the cooling gas inlet 591. The cooling gas entering the reactor tube under a slight pressure relative to the reacted gas produces a weak shock wave 75 which accelerates the cooled, processed gas toward the downstream end of the tube. The processed gas leaves the reactor tube through the outlet 491 which remains open long enough to complete the scavenging of the processed gas. The interface between the processed gas and the cooling gas is represented by the dotted line 76 in Fig. 7.

It will be noted that when the interface 76 arrives at the downstream end of the reactor tube, the tube is opposite the cooling gas outlet 601. Continued rotation of the reactor tube moves its upstream end to a position opposite the preheated reactant gas inlet 431. Since the pressure of the preheated reactant gas is above that of the cooling gas in the reactor tube, a shock wave indicated in Fig. 7 by the numeral 77 is generated. The weak shock wave 77 accelerates the scavenging of the cooling gas out the cooling gas outlet 601. The interface between the cooling gas and the fresh charge of preheated reactant gas being inducted into the reactant tube is represented by the dotted line 78. The interface 78 arrives at the downstream end just as the reactor tube is being rotated into a position opposite the driver gas inlet 321 at which point the cycle of the particular reactor tube being considered begins over again.

Referring to Fig. 8, the annular arrangement of the various inlets and outlets and wall and reflecting plate are shown. This diagram in Fig. 8 shows the direction of rotation of the reactor tube as counterclockwise and also the circumferential extent of the various inlets, outlets and wall and reflecting plate. The driver gas inlet is shown in Fig. 8 as beginning at the bottom dead center position of the diagram and corresponds to the bottom position shown in the developed diagram in Fig. 7.

The above described sequence of events occurs successively in each of the reactor tubes as the drum is rotated so that a continuous supply of processed gas is discharged into the outlet nozzle 49.

The modified form of the chemical reactor shown in Figs. 9 through 13 is similar in all respects to that shown in Figs. 1 through 8 with the exception that the cooling gas pass is eliminated. Since this eliminates the cooling gas inlet at the upstream end of the reactor and the cooling gas outlet at the downstream end thereof, a different circumferential orientation of the remaining inlets and outlets and walls at opposite ends of the modified reactor is required.

Referring to Fig. 9, the modified reactor is represented generally by the numeral 201. At its upstream end, best shown in Fig. 13, there is a reflecting plate 691 and a preheated reactant gas inlet nozzle 482. At the downstream end of the modified reactor 201 there is a driver gas inlet nozzle 322, arcuate wall 681, driver gas outlet nozzle 332, and processed gas outlet 492. Comparing Figs. 4 and 12, it will be noted that the arcuate wall 681 is of greater circumferential extent than the similar wall 68. Comparing Figs. 6 and 13, it will be noted that the reflecting plate 691 has a greater circumferential extent than the similar plate 69.

Comparing Figs. 7 and 10, it will be seen that these diagrams are identical with the exception that the cooling gas inlet and outlet have been omitted from Fig. 10. The reference numerals applied to the respective inlet and outlet nozzles and walls in Fig. 9 have been used in Fig. 10 to represent the corresponding elements. As between the two diagrams (Figs. 7 and 10), it will be noted that the interface represented by the dotted line 79 in Fig. 10 is an interface between the processed gas and fresh charge of preheated reactant gas. When a reaction tube is moved opposite the preheated reactant gas inlet 482, a shock wave represented by the line 80 in Fig. 10 is generated which accelerates the movement of the processed gas toward the outlet 492.

Fig. 11, like Fig. 8, indicates the direction of rotation as counterclockwise and the circumferential extent of the various inlets, outlets and wall and reflecting plate. The beginning of the driver gas inlet in Fig. 11 is shown as being at the bottom dead center position which corresponds to the bottom of the developed diagram shown in Fig. 10.

While the various reactor tubes shown in both forms of reactors 20 and 201 are illustrated as being longitudinally straight, these tubes, if desired, may be any other suitable configuration.

The reactor tube wall temperature is kept down by the unsteady nature of the wave processes which alternately exposes each tube to hot and cold gas. Because of the large heat capacity of the metal or other suitable material of which the reactor is constructed, compared to the gas, the wall temperature will not be greatly changed during a single cycle so there will not be any large thermal stresses. The temperature will undergo a small fluctuation around an average temperature determined by balancing the heat transfer into the wall when the gas is hot with the heat flow out when the gas is cold.

Top speeds of the rotating reactor can be kept low so as not to result in excessive centrifugal stresses. A small reactor rotating at moderate velocities, can handle the output of a large compressor without serious thermal and mechanical stresses.

From the foregoing, it will be seen that the present invention provides a method for continuously processing reactant gas by the successive action of compression and expansion waves to provide continuous production of the processed gas. Also, the present invention provides apparatus including a chemical reactor of simple construction which is rotated past stationary inlet and outlet nozzles for the various gases and stationary walls at opposite ends of the reactor, all mechanical parts being so proportioned and arranged so as to permit of successive reaction cycles to take place by the mere rotation of the reactor.

It will be apparent to those skilled in the art that many variations may be desirable and may readily be produced both in the method and apparatus described above to increase efficiency or to accommodate certain types of gas phase reactions. The scope of the invention is not to be limited by the illustrations hereinabove described, but is to be determined by the appended claims.

We claim:

1. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply driver gas to said driver gas inlet nozzle, means arranged to supply reactant gas to said reactant gas inlet nozzle, and means for recovering the processed gas discharged into said processed gas outlet nozzle.

2. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply a hot and pressurized driver gas to said driver gas inlet nozzle including a combustion chamber in which air and fuel are combusted to provide the driver gas, means arranged to supply reactant gas to said reactant gas inlet nozzle, and means for recovering the processed gas discharged into said processed gas outlet nozzle.

3. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply a hot and compressed driver gas to said driver gas inlet nozzle including means arranged to compress air and a combustion chamber in which the compressed air is combusted with fuel to provide the driver gas, means arranged to supply reactant gas to said reactant gas inlet nozzle, and means for recovering the procesesd gas discharged into said processed gas outlet nozzle.

4. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply a hot and compressed driver gas to said driver gas inlet nozzle including an air compressor, heat exchanger and combustion chamber in which the compressed air is combusted with fuel to provide the driver gas, means arranged to conduct the driver gas discharged into said driver gas outlet nozzle through said heat exchanger so as to give up some of its remaining heat to the air before entering said combustion chamber, means arranged to supply reactant gas to said reactant gas inlet nozzle, and means for recovering the processed gas discharged into said processed gas outlet nozzle.

5. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply driver gas to said driver gas inlet nozzle, means arranged to supply preheated reactant gas to said reactant gas inlet nozzle, and means for recovering the processed gas discharged into said processed gas outlet nozzle.

6. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply driver gas to said driver gas inlet nozzle, means arranged to supply preheated reactant gas to said reactant gas inlet nozzle and including a heat exchanger, and means for recovering the processed gas discharged into said processed gas outlet nozzle and conducting such gas through said heat exchanger so as to give up some of its remaining heat to preheat the reactant gas.

7. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle and a processed gas outlet nozzle all arranged at one end of said reactor and adapted to be traversed by the ends of said tubes, a reactant gas inlet nozzle and a reflecting plate arranged at the other end of said reactor and adapted to be traversed by the other ends of said tubes, means arranged to supply a hot and compressed driver gas to said driver gas inlet nozzle, means arranged to supply preheated reactant gas to said reactant gas inlet nozzle, and means for recovering the processed gas discharged into said processed gas outlet nozzle.

8. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle, a processed gas outlet nozzle and a cooling gas outlet nozzle all arranged at one end of said reactor and adapted to be traversed by the ends of said tubes, a reactant gas inlet nozzle, a reflecting plate and a cooling gas inlet nozzle all arranged at the other end of said reactor and adapted to be traversed by the other ends of said tubes, means arranged to supply driver gas to said driver gas inlet nozzle, means arranged to supply reactant gas to said reactant gas inlet nozzle, means arranged to supply cooling gas to said cooling gas inlet nozzle, and means for recovering the processed gas discharged into said processed gas outlet nozzle.

9. Apparatus for continuously carrying out a gas phase reaction which requires a high temperature to promote the reaction and rapid cooling to preserve the reaction product, which comprises a rotatable reactor having an annular series of open ended tubes, a driver gas inlet nozzle, a wall, a driver gas outlet nozzle, a processed gas outlet nozzle and a cooling gas outlet nozzle all arranged at one end of said reactor and adapted to be traversed by the ends of said tubes, a reactant gas inlet nozzle, a reflecting plate and a cooling gas inlet nozzle all arranged at the other end of said reactor and adapted to be traversed by the other ends of said tubes, means arranged to supply a hot and compressed driver gas to said driver gas inlet nozzle, means arranged to supply preheated reactant gas to said reactant gas inlet nozzle, means arranged to supply cooling gas to said cooling gas inlet nozzle, and means for recovering the processed gas discharged into said processed gas outlet nozzle.

10. The method of rapidly heating and cooling a process gas, which comprises introducing the process gas into the upstream end of a chamber, introducing a pulse of pressurized driver gas into the downstream end of said chamber whereby a shock wave and also a fan of expansion waves are generated which propagate upstream through the process gas, reflecting both such waves at said upstream end, and exhausting from said downstream end first the driver gas and then the processed gas resulting from the processing of the process gas by such waves.

11. The method of rapidly heating and cooling a process gas, which comprises introducing the process gas into the upstream end of a chamber, rapidly introducing a pressurized driver gas into the downstream end of said chamber whereby a shock wave is generated which propagates upstream through the process gas, rapidly cutting off the supply of the driver gas whereby a fan of expansion waves are generated which propagate upstream through the process gas, reflecting both such waves at said upstream end, and exhausting from said downstream end first the driver gas and then substantially separately the processed gas resulting from the processing of the process gas by such waves.

12. The method of rapidly heating and cooling a process gas, which comprises introducing the process gas into the upstream end of a chamber, introducing a pulse of pressurized driver gas into the downstream end of said chamber whereby a shock wave and also a fan of expansion waves are generated which propagate upstream through the process gas, reflecting both such waves at said upstream end, exhausting from said downstream end first the driver gas and then the processed gas resulting from the processing of the process gas by such waves, and introducing another body of gas into said upstream end so as to form an interface with the trailing end of the body of processed gas being exhausted from said chamber.

13. The method of rapidly heating and cooling a process gas, which comprises introducing the process gas into the upstream end of a chamber, introducing a pulse of pressurized driver gas into the downstream end of said chamber whereby a shock wave and also a fan of expansion waves are generated which propagate upstream through the process gas, reflecting both such waves at said upstream end, exhausting from said downstream end first the driver gas and then the processed gas resulting from the processing of the process gas by such waves, flowing a cooling gas through said chamber from said upstream end toward said downstream end thereof, the cooling gas having an interface with the processed gas, and exhausting the processed gas from said downstream end substantially separately from the cooling gas.

14. The method of rapidly heating and cooling a process gas, which comprises preheating the process gas, compressing and preheating a driver gas, introducing the preheated process gas into the upstream end of a chamber, introducing a pulse of the hot and compressed driver gas into the downstream end of said chamber whereby a shock wave and also a fan of expansion waves are generated which propagate upstream through the process gas, reflecting both such waves at the upstream end, and exhausting from said downstream end first the driver gas and then the processed gas resulting from the processing of the process gas by such waves.

15. The method of rapidly heating and cooling a process gas, which comprises preheating the process gas, compressing and preheating a driver gas, introducing the preheated process gas into the upstream end of a chamber, introducing a pulse of the hot and compressed driver gas into the downstream end of said chamber whereby a shock wave and also a fan of expansion waves are generated which propagate upstream through the process gas, reflecting both such waves at said upstream end, exhausting from said downstream end first the driver gas and then the processed gas resulting from the processing of the process gas by such waves, and utilizing the discharged driver gas to partially heat driver gas to be used in a subsequent cycle of operation.

16. The method of rapidly heating and cooling a process gas, which comprises preheating the process gas, compressing and preheating a driver gas, introducing the preheated process gas into the upstream end of a chamber, introducing a pulse of the hot and compressed driver gas into the downstream end of said chamber whereby a shock wave and also a fan of expansion waves are generated which propagate upstream through the process gas, reflecting both such waves at said upstream end, exhausting from said downstream end first the driver gas and then the processed gas resulting from the processing of the process gas by such waves, and utilizing the discharged processed gas to preheat process gas to be used in a subsequent cycle of operation.

17. The method of rapidly heating and cooling a process gas, which comprises introducing the process gas into the upstream end of a tube for a predetermined time interval, introducing a pulse of pressurized driver gas into the downstream end of said tube at about the time the same has been filled with the process gas whereby a shock wave is first and then a fan of expansion waves is generated which propagate upstream through the process gas, closing said upstream end for a predetermined time interval to reflect said waves, opening said downstream end to permit the driver gas to be first scavenged and the processed gas resulting from the processing of the process gas by said waves to be thereafter scavenged from said downstream end, and opening said upstream end to introduce a fresh charge of process gas into said tube to repeat the cycle of operation.

18. The method of rapidly heating and cooling a process gas, which comprises introducing a preheated process gas into the upstream end of a tube for a predetermined time interval, rapidly introducing a hot and compressed driver gas into the downstream end of said tube beginning at about the time said tube has been filled with the process gas whereby a shock wave is generated which propagates upstream through the process gas, rapidly closing said downstream end after a predetermined time interval whereby a fan of expansion waves is generated which travels upstream through the process gas, closing said upstream end for a predetermined time interval to reflect said waves, opening said downstream end to permit the driver gas to be first scavenged and the processed gas resulting from the processing of the process gas by said waves to be thereafter scavenged, collecting said scavenged processed gas substantially separate from said scavenged driver gas, and opening said upstream end to introduce a fresh charge of process gas into said tube to repeat the cycle of operation.

19. The method of rapidly heating and cooling a process gas, which comprises introducing a preheated process gas into the upstream end of a tube for a predetermined time interval, rapidly introducing a hot and compressed driver gas into the downstream end of said tube beginning at about the time said tube has been filled with the process gas whereby a shock wave is generated which propagates upstream through the process gas, rapidly closing said downstream end after a predetermined time interval whereby a fan of expansion waves is generated which travels upstream through the process gas, closing said upstream end for a predetermined time interval to reflect said waves, opening said upstream end and introducing a cooling gas for a predetermined time interval, opening said downstream end to permit the driver gas to be first scavenged, the processed gas resulting from the processing of the process gas by said waves next scavenged and the cooling gas finally scavenged, collecting said scavenged processed gas substantially separate from said scavenged driver gas and said scavenged cooling gas, and introducing a fresh charge of process gas into said tube to repeat the cycle of operation.

References Cited in the file of this patent

UNITED STATES PATENTS

| 1,283,112 | Drawe | Oct. 29, 1918 |
| 2,399,394 | Seippel | Apr. 30, 1946 |
| 2,690,960 | Kistrakowsky | Oct. 5, 1954 |

OTHER REFERENCES

Lessing: "Scientific American," vol. 188, No. 5, pp. 29–35, May 1953.